June 15, 1948.  S. H. BERCH  2,443,531
CARTON FOR FOOD PRODUCTS
Filed July 12, 1947
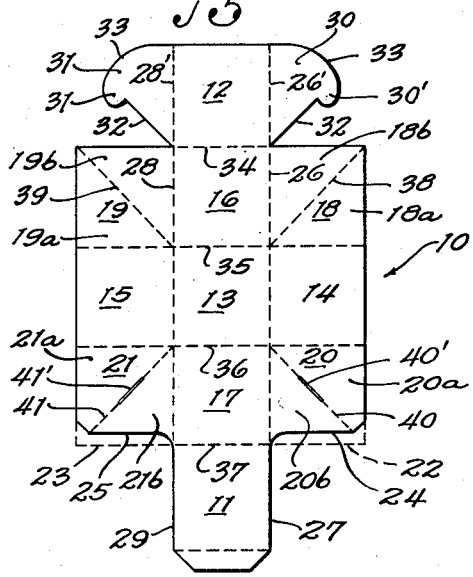
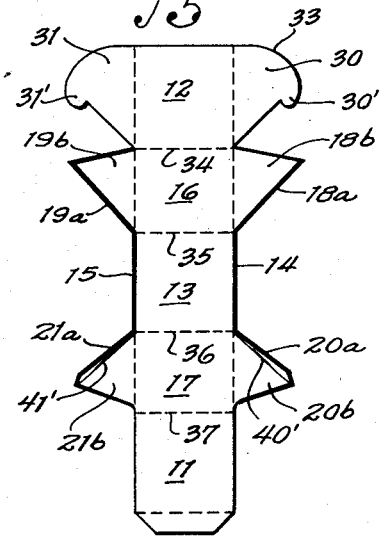
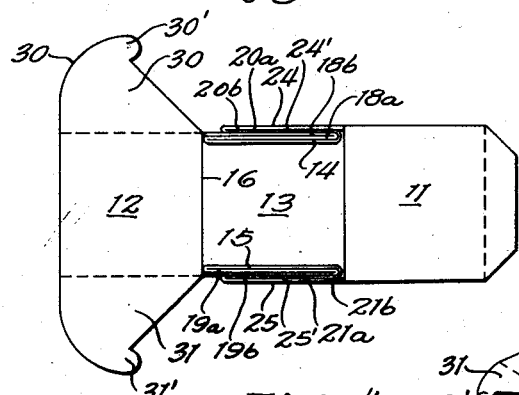
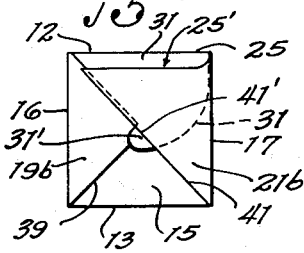
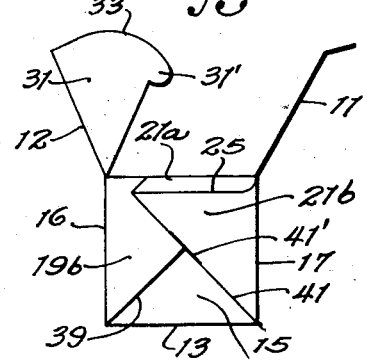
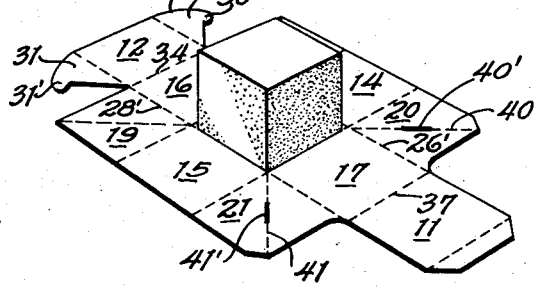
INVENTOR,
SAMUEL H. BERCH
BY James M. Abbett
ATTORNEY Patented June 15, 1948

2,443,531

UNITED STATES PATENT OFFICE 2,443,531

CARTON FOR FOOD PRODUCTS

Samuel H. Berch, Beverly Hills, Calif.

Application July 12, 1947, Serial No. 760,611

2 Claims. (Cl. 229—31)

This invention relates to a container, and particularly pertains to a carton for food products, and is a continuation in part of co-pending application Serial No. 561,235, entitled Carton for ice-cream and the like, and filed by me October 31, 1944.

In the retail sale of ice-cream, this product is either dispensed from a bulk supply or in packages which measure the ice-cream in quarts, pints or half-pints. When ice-cream is sold in packages in this unit of measure the price of the package is often an off-number of cents and does not have a fixed unit of monetary value. These packages are usually kept in cooling compartments in grocery stores and the like, where they are accessible to the customers and from which compartments the customer may select such packages as he chooses, both with reference to the quantity purchased and the flavor. In the event the purchaser desires to obtain ice-cream of more than one flavor, it is necessary to buy packages which may carry more helpings of ice-cream than is required in order to obtain a desired assortment of flavors. It is therefore desirable to provide packaged ice-cream which has a fixed unit of monetary value and represents an individual helping of ice-cream, either for home or fountain use. The other alternative to buying packaged ice-cream as now available is to buy ice-cream in bulk. This has many disadvantages. In the first place it is often unsanitary due to the fact that the ice-cream must be scooped from a large container which is temporarily open to the atmosphere, and in which it is necessary to use a scoop which might be unsanitary. The retail sale of ice-cream from bulk does not insure a uniform profit for the dealer or the consumer. This is due primarily to the fact that there is a large percentage of shrinkage in bulk in ice-cream since ice-cream is practically fifty-percent air and is gradually reduced in volume in the bulk container. This encourages the practice to gradually reduce the size of helping at soda fountains and the like as the container becomes empty, in order to compensate for shrinkage in volume and the profit loss. Furthermore, the dealer experiences a loss due to spoilage, particularly that caused of necessity of rinsing the ice-cream scoop in water before dipping it into the ice cream. If the water is warm there is a tendency to cause the ice-cream to melt, and in any event the drops of water which fall into the ice-cream freeze into small beads of ice which detract from the edibility of the product. The consumer also gets an uncertain value for his money, due to the fact that when the ice-cream is sold in bulk it may vary in consistency so that it is more or less difficult to repack in a carton. This is further true since the compactness of the mass of ice-cream in the carton may be relatively loose or solid. When it is packed too solid the transaction is unprofitable to the dealer, since the normal air content is compressed from the mass of ice-cream so that it is not in its natural state and requires a larger volume of ice-cream to fill the carton than represented by a measured unit of ice-cream within the storage container. It will also be obvious that if the carton is filled loosely the customer will not obtain proper value for the purchase price. It is desirable, therefore, to provide a unit of measure for ice-cream representing an individual helping as might be served at a soda fountain in ice-cream sodas or served as a dessert, said individual helpings having a fixed monetary value per unit and being dispensed in individual packages into which the ice-cream is placed without being touched by the human hand, so that it is sanitary, said carton being further designed to insure that the ice-cream content thereof may be easily and quickly unwrapped and disassociated from the walls of the carton even though the packages have been in storage at freezing temperatures.

It is the principal object of the present invention, therefore, to provide a simple and inexpensive carton within which a measured quantity unit of ice-cream may be wrapped or enclosed by a full automatic mechanical method, and which carton insures that the ice-cream content may be quickly emptied therefrom without requiring the use of a spoon or other scraping means, the carton having the further advantage of making it possible for the ice-cream to be served therein with the aid of a spoon or to be eaten therefrom in the same manner as when ice-cream is eaten from a cone.

The present invention contemplates the provision of a carton blank formed of a sheet of cardboard or the like scored in a manner to form an enclosure for a unit quantity of ice-cream, and provide with interlocking tangs whereby the parts of the blank when folded around the quantity of ice-cream will produce a closed container capable of being easily manipulated to restore the folded blank into its flat condition.

The invention is illustrated by way of example in the accompanying drawings in which:

Figure 1 is a view in plan showing the blank from which the carton is formed and indicating the score lines thereon for folding.

Fig. 2 is a view in plan showing the blank as partially folded.

Fig. 3 is a view in plan showing the blank as completely folded and indicating the side folds whereby gussets are formed tending to prevent positive adherence of a mass of ice-cream to the walls of the carton and acting to quickly separate the mass of ice-cream from the carton walls when the carton is opened.

Fig. 4 is a view in side elevation showing the carton in the condition disclosed in Fig. 3 preparatory to final closing of the carton.

Fig. 5 is a view similar to Fig. 4 showing the manner in which the carton is closed.

Fig. 6 is a view in perspective showing the package after it has been opened and indicating particularly the relationship of the quantity of material which had been packed therein.

Referring more particularly to Fig. 1 of the drawings, it will be seen that a carton blank is provided for making a cube-shaped container. It is to be understood that rectangular containers having walls of different proportions than those illustrated may be made, and it is to be explained that while the carton is described as being particularly adapted for use with ice-cream that it may be used to advantage with other products, such for example as cheese. The carton blank may be made of cardboard or paper of suitable stock and comprises a substantially square main field 10 having a closing flap 11 at one end thereof and a top flap 12 at the opposite end thereof. The main field 10 of the blank is divided into nine separate fields, here shown as forming a square center field 13 bounded by opposite side fields 14 and 15 and end fields 16 and 17. At the corners of the center field 13 are gusset fields 18, 19, 20 and 21. The fields 13 to 19, inclusive, are here shown as being of the same size and shape. The fields 20 and 21 have portions 22 and 23 cut away, as indicated by dotted lines in Fig. 1 to form edges 24 and 25, the purpose of which will be hereinafter described. One side of each of the fields 13, 16 and 17 is delineated by a score line 26. This score line is a continuation of one edge of the flap 11 and is indicated at 27. The opposite end of this score line is continued across the top flap 12 and is indicated at 26'. The diametrically opposite sides of the fields 13, 16 and 17 are defined by a score line 28, which is a continuation of the edge 29 of the closing flap 11. The opposite end of the score line 28 continues as indicated at 28' to cross the top flap 12. Thus, the top flap 12 is subdivided to provide sealing tangs 30 and 31 which fold at right angles to the top flap 12 along the score lines 26' and 28' and have outer edges 32 which are at ninety degrees to the score lines 26' and 28' and terminate in arcuate edges 33 which are described by a radius struck from the point of intersection of the scoring lines 26' and 28' and the diagonal edges 32 when the tangs are folded, so that they will swing into position, as will be hereinafter described, each of these tangs carries a projecting tab designated at 30' and 31'. Transverse score lines 34, 35, 36 and 37 act to define edges of contiguous fields 11 to 21, inclusive. The gusset fields 18 and 19 are divided diagonally by score lines 38 and 39, respectively, which lines extend from corners of the field 13 to the outer corners of the main field 10. Diagonal score lines 40 and 41 are formed on the fields 20 and 21 and are at right angles to the score lines 26 and 28, although they do not extend to the exact corners of the fields 20 and 21 for a purpose to be hereinafter described. Slits 40' and 41', respectively, are formed midway the length of the diagonal lines 40 and 41 to receive tabs 30' and 31'. The gusset field 18 thus provides portions 18ª and 18ᵇ. The gusset field 19 provides portions 19ª and 19ᵇ. The gusset field 20 provides portions 20ª and 20ᵇ, and the gusset field 21 provides portions 21ª and 21ᵇ.

Referring particularly to Figs. 2 to 4, inclusive, the method of forming the carton is shown. Here it will be seen that when the fields 16 and 17 are folded upwardly the gusset fields 18, 19, 20 and 21 will fold outwardly as the fields 14 and 15 fold to perpendicular positions at opposite sides of the horizontally disposed center field 13. As the folding motion is continued the fields 16 and 17 will be brought to a perpendicular position with relation to the center field 13, and will produce a container which is here shown as being cubical. The gusset fields 18 and 19 are then folded inwardly against the side fields 14 and 15 with the portions 18ª and 19ᵇ lying innermost, and the portions 18ª and 19ᵇ lying outermost. It will thus be seen that neither triangular portions of the gusset fields 18 nor 19 come into intimate contact with the contents of the container, and are loosely held so that they will have a slight resilient action as distinguished from the action of a rigid flat wall lying against the contents of the container. The gusset fields 20 and 21 are then folded over the gusset fields 18 and 19. This will cause the portions 20ª and 21ª to fold in against the portions 18ᵇ and 19ᵇ and will present the gusset portions 20ᵇ and 21ᵇ outwardly. It will thus be noted that the edges 24 and 25 of these gusset portions will lie below the upper edges of the side wall formed by the folded panels, and will thus give access to sealing pockets 24' and 25', which are presented upwardly to receive the sealing tangs 30 and 31. When the carton has been folded, as shown in Fig. 3, it may be placed within a frame or mold so that it will be held while it is filled, after which the closing flap 11 is folded over the top of the contents of the container, and due to the side wall thickness produced by the panels 14 and 15 and the associated folded gusset panels will be supported substantially out of contact with the contents of the container. The sealing flaps 30 and 31 are then inserted into the pockets 24' and 25' and the package is folded down into its closed and sealed position, as shown in Fig. 5 of the drawing, and the tabs 30' and 31' will extend through slits 40' and 41' to temporarily lock the tangs in position. The filled and completed package may then be dispensed either for use in soda fountains, restaurants and the like, where individual helpings of ice-cream are desired. It may also be dispensed by dealers who usually sell bulk ice-cream or by dealers who make a freezing cabinet aavilable to the customers so they can help themselves.

Attention is directed to the fact that when the carton is folded each surface which contacts the ice-cream or other material packed therein is continuous and smooth from corner to corner of the container and does not present any folds or seams in the inner faces of the carton walls, for example, the inner walls represented by the fields 11–17, inclusive. The fields 18, 19, 20, and 21 are folded exteriorly of the carton with the fields 20 and 21 outermost so that the tangs 31 and 33 may be inserted between the fields 20ª and 20ᵇ, and 21ª and 21ᵇ.

It is contemplated that the individual packages shall have a unit price, such for example as five cents. It will be seen that by this method of merchandising a customer may be free to select an assorted number of helpings of ice-cream without buying a larger quantity than desired, and that the dealer will be able to buy the packages at a fixed unit price and sell the packages at a fixed margin of profit without danger of spoilage or shrinkage.

When the ice-cream is to be removed from the carton, either for serving in a public eating place or at home, it is only necessary to lift the free edge of the sealing flap 12. This will withdraw the tangs 30 and 31 from the pockets 24' and 25', and then due to the inherent resiliency of the folded gusset panels 20 and 21 they will swing outwardly. At this time it will be found that the closing flap 11 has not adhered tightly to the upper surface of the block of ice-cream within the carton, and that it may be easily swung upwardly and outwardly toward the position shown in Fig. 3. By then grasping the top flap 12 and the closing flap 11 these flaps may be pulled in opposite directions and will cause the gussets to completely unfold. As the free edges of the panels 16 and 17 are forced downwardly to the plane of the bottom panel 13 the panels 14 and 15 will tend to pull away from the opposite sides of the block of ice-cream, or other commodity indicated in Fig. 6 at 42, thus presenting the block of ice-cream so that it may be easily removed from the blank by turning the blank over and allowing the block 42 to drop into a glass or dish.

It will be noted that when the carton is opened and emptied the fold 12 is first lifted to pull the tangs 31 and 33 from between the folded side fields, after which the field 11, which had completedly covered the top of the contents of the carton, is then lifted. The operator then holds the fields 11 and 12, turns the carton upside down, and pulls the fields 11 and 12 apart. This causes the side gussets to unfold and to draw the fields 11, 12, 13, 16 and 17 in substantial alignment. The fingers of the two hands may then be placed under the unfolded side gussets of fields 18, 19, 20 and 21. This will pull the fields 14 and 15 away from the contents of the container so that it may be shaken loose from the bottom field 13. This entire operation is performed without touching the contents of the container in any way. It is to be further noted that since the gussets did not fold inwardly there was no possibility for the ice-cream or other contents to get in between the folds and to prevent easy emptying of the package; and furthermore, it eliminates waste of ice-cream which might adhere in the folded areas.

It will thus be seen that the carton here disclosed provides simple and inexpensive means for packaging ice-cream and food products under sanitary conditions without being touched by human hands either in placing the commodity within the package or removing it therefrom, and that the the merchandising of a commodity in the carton here disclosed insures a definite margin of profit to the dealer and a definite commodity of fixed value to the consumer.

While I have shown the preferred form of my invention as now known to me, it will be understood that various changes may be made in combination, construction and arrangement of parts by those skilled in the art, without departing from the spirit of the invention as claimed.

Having thus described my invention, what I claim and desire to secure by Letters Patent is:

1. A container for a brick of ice-cream or the like, comprising a sheet of material scored to define folds representing the bottom and side walls of the container, and folded gusset fields adapted to overlap each other on an intermediate side wall and disposed exteriorly of said intermediate side walls, the upper edges of said folded gusset fields agreeing substantially in length with the width of the side wall against which said fields are folded, a slit formed midway the length of the fold of each of the outer folded gussets, a top flap adapted to close the compartment formed by the blank, tangs carried by the top flap to be inserted into folds of the outermost gusset fields to temporarily hold the carton in its closed position, and tabs carried at the edges of said tangs adapted to pass through the slits in the folded gussets to interlock therewith.

2. A wrapper for a brick of ice-cream or the like, said brick having six flat sides, the wrapper comprising a sheet of material scored longitudinally and transversely to define a center field upon which said brick rests, opposite side fields adapted to form side walls of a container when folded perpendicularly to the center field, opposite end fields adapted to form end walls of the container when folded perpendicularly to the center field, gusset fields agreeing in length with the contiguous side fields and being formed at the corners of the blank and having diagonal score marks whereby the gusset fields will fold to form triangular gussets, the gussets on one side of opposite end fields overlapping each other and a complementary side field and being disposed exteriorly of said side field whereby the openings in the folds of the gussets will be presented uppermost and will extend the width of the side fields and lie thereagainst, the outer field of each folded gusset being shorter than the inner field, a slit formed through the fold of each of said gussets, a cover flap formed along the outer edge of one end wall and being adapted to cover the compartment formed by the bottom and side walls, a top flap formed along the outer edge of the opposite end wall and being adapted to overlap the cover flap, tangs formed along the opposite marginal edges of the cover flap and the length thereof and adapted to enter the fold of the outermost gussets, a tab carried by each of said tangs to enter said slits, whereby the wrapper will be held in a closed position around the brick.

SAMUEL H. BERCH.

REFERENCES CITED

The following references are of record in the file of this patent:

UNITED STATES PATENTS

| Number | Name | Date |
| --- | --- | --- |
| 615,417 | Wilcox | Dec. 6, 1898 |
| 1,567,594 | Hitzert | Dec. 29, 1925 |
| 1,922,399 | Schilling | Aug. 15, 1933 |
| 2,174,179 | O'Brien | Sept. 26, 1939 |